United States Patent Office.

LEVI ROGERS, OF MOREHOUSE PARISH, LOUISIANA.

Letters Patent No. 78,017, dated May 19, 1868.

IMPROVED MEDICAL COMPOUND.

*The Schedule referred to in these Letters Patent and making part of the same.*

TO ALL WHOM IT MAY CONCERN:

Be it known that I, LEVI ROGERS, of the parish of Morehouse, in the State of Louisiana, have invented a certain new and useful Composition of Matter to be used as a Medicine; and I do hereby declare the following to be a full, clear, and exact description of the same, and of my method of compounding and using it.

I take one pound of green swamp-palmetto root, finely divided by cutting or grating, put it into one gallon and a half of distilled water, and boil slowly in any suitable vessel or retort, until the admixture is reduced by evaporation to two quarts. While the liquid is still warm I add four ounces of the best quality of white sugar, and afterwards fifty drops of nitric acid. This completes the process, and the extract is ready to be bottled for use. If a larger or smaller quantity be required, or is to be made, the same proportions, it will of course be understood, are to be employed.

The dose for an adult is two liquid ounces, or an ordinary wine-glassful, three times a day. If the extract is to be converted into a tincture, it is easily done by reducing its consistency by an infusion of a given quantity of diluted alcohol. If into a sirup, by the addition of a given quantity of simple sirup. In either of its forms any flavor may be given to the compound by the addition of the usual aromatics employed for such purpose. If converted into a tincture or sirup, the dose for an adult is to be regulated by the proportion of the pure extract that has been used in preparing it.

In either and all its forms my compound is a certain specific and remedy for ulcerations, irritations, and other affections of the kidneys, bladder, and urethra, for piles, for diseases of the throat, general debility or weakness, whites, and like complaints, for syphilis, gonorrhœa, gleet, strictures, leucorrhœa, diabetes, stranguary, and all other diseases of the organs of generation. It will not only cure these, and other diseases I have not deemed it necessary to specify, but it will cure them permanently and in a few days' time.

Having thus described my invention, what I claim, and desire to secure by Letters Patent, is—

The medical compound herein described, when made of the ingredients herein mentioned, in the proportions and by the method stated, for the purpose set forth.

LEVI ROGERS.

Witnesses:
RUFUS R. RHODES,
LYMAN HARDING.